(No Model.)
M. LUDWIG.
CHOPPING KNIFE.
No. 379,584. Patented Mar. 20, 1888.
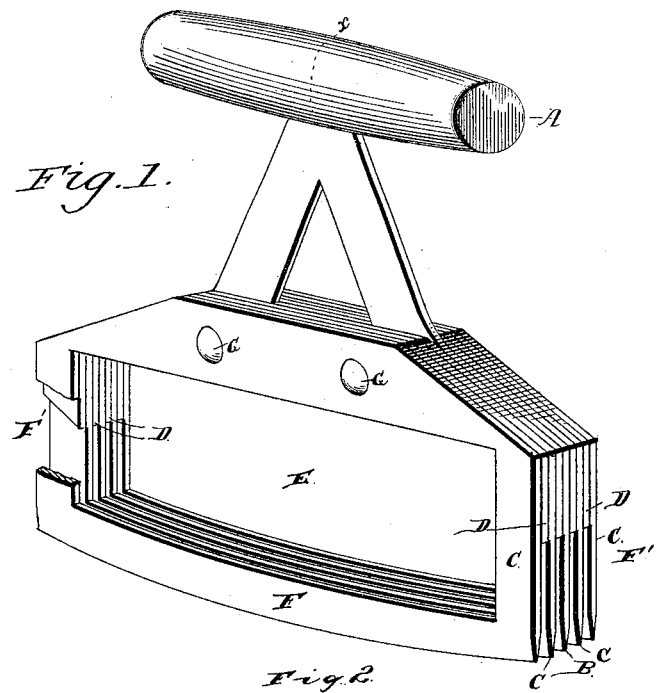
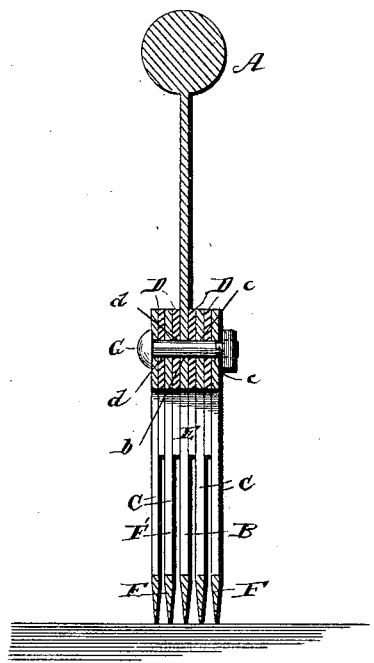
Witnesses.
Geo. P. Thorpe
C. E. Doyle
Inventor.
Mrs. Mary Ludwig
By her Attorneys
C. A. Snowden

UNITED STATES PATENT OFFICE.

MARY LUDWIG, OF BUCYRUS, OHIO.

CHOPPING-KNIFE.

SPECIFICATION forming part of Letters Patent No. 379,584, dated March 20, 1888.

Application filed November 23, 1887. Serial No. 256,011. (No model.)

*To all whom it may concern:*

Be it known that I, MARY LUDWIG, a citizen of the United States, residing at Bucyrus, in the county of Crawford and State of Ohio, have invented new and useful Improvements in Knives, of which the following is a specification.

My invention relates to improvements in chopping-knives; and it consists in a cutter for chowchow, &c., having a series of parallel blades arranged close together and provided with registering slots. Knives having two or more blades have been heretofore used; but the meat or material under treatment works up between the parallel blades, if they are solid, and prevents them from properly cutting. Further, this material between the blades is difficult to remove, as it becomes firmly packed by the operation of the cutter. Further, the forcing of this material between the blades is liable to strain the fastenings of the latter and press them apart, thus in a short time ruining the implement. These disadvantages are obviated by forming registering slots in the blades, through which the material which passes up between the latter may escape by falling out at the side.

My invention is more fully described hereinafter in connection with the accompanying drawings, wherein—

Figure 1 is a perspective view of the knife. Fig. 2 is a transverse section of the same.

Referring by letter to the drawings, A represents the handle of the knife, to which (at the lower end) is attached the blade B. This blade is preferably formed integral with the handle, and constitutes the central blade of the cutter.

C C designate the removable blades, which are secured on opposite sides of the central blade.

D D represent plates, one of which is disposed between each two of the blades to hold the latter apart, so that they will cut separately. These plates may be of any desired thickness to hold the blades at any desired distance apart to suit the material which is being cut.

The central blade is provided near the upper edge with apertures $b\ b$, and the removable blades C are provided with similar apertures, $c\ c$, near their upper edges to register with the apertures in the central blade; also, the intermediate plates, D, are provided with apertures $d\ d$, which register with the apertures $c$ and $b$. Through these registering apertures are passed the bolts G G, which are provided on the ends with nuts, whereby the blades may be drawn tightly against the intermediate plates, and thus prevent rattling while the cutter is in use.

The slots E E in the blades are so formed as to leave only a narrow cutting-edge, F, and a narrow standard, F', at each end of the said cutting-edge. Thus the material which is being cut cannot lodge between the blades, but will, if pressed up between them, fall out through the slots.

A further advantage in providing the blades with slots is that in this way the weight of the cutter is materially reduced without depriving the blades of their necessary strength.

Any desired number of blades may be attached to the cutter; but they are preferably so arranged that there is an equal number upon both sides of the central blade. The object of this is to maintain the cutter evenly balanced on the handle.

My improved cutter, as will be seen, is simple, light, and may be adjusted to have any desired number of blades. All the adjustable blades may be removed and the device used as a single knife.

If preferred, the plates D may be replaced by shoulders formed on the sides of the blades, thereby enabling the knife to be constructed with fewer parts; but I prefer the construction herein shown and described.

Having thus described my invention, I claim—

The herein-described knife, comprising the central blade, B, having the slot E and the apertures $b\ b$ therein, the handle A, attached to the said blade, the blades C C, having the slots E E and the apertures $c\ c$ therein, registering, respectively, with the slot E and the apertures $b\ b$ in the blade B, the intermediate plates, D D, arranged between the blades and having apertures $d\ d$, registering with the apertures $c$ and $b$, and the adjusting-bolts G G, engaging in the said registering apertures, substantially as and for the purpose hereinbefore specified.

In testimony that I claim the foregoing as my own I have hereto affixed my signature in presence of two witnesses.

MARY LUDWIG.

Witnesses:
L. C. DONNENWIRTH,
FRANK E. DONNENWIRTH.